(No Model.)
H. A. WEBER.
ICE CREAM MOLD AND DISHER.
No. 599,157. Patented Feb. 15, 1898.
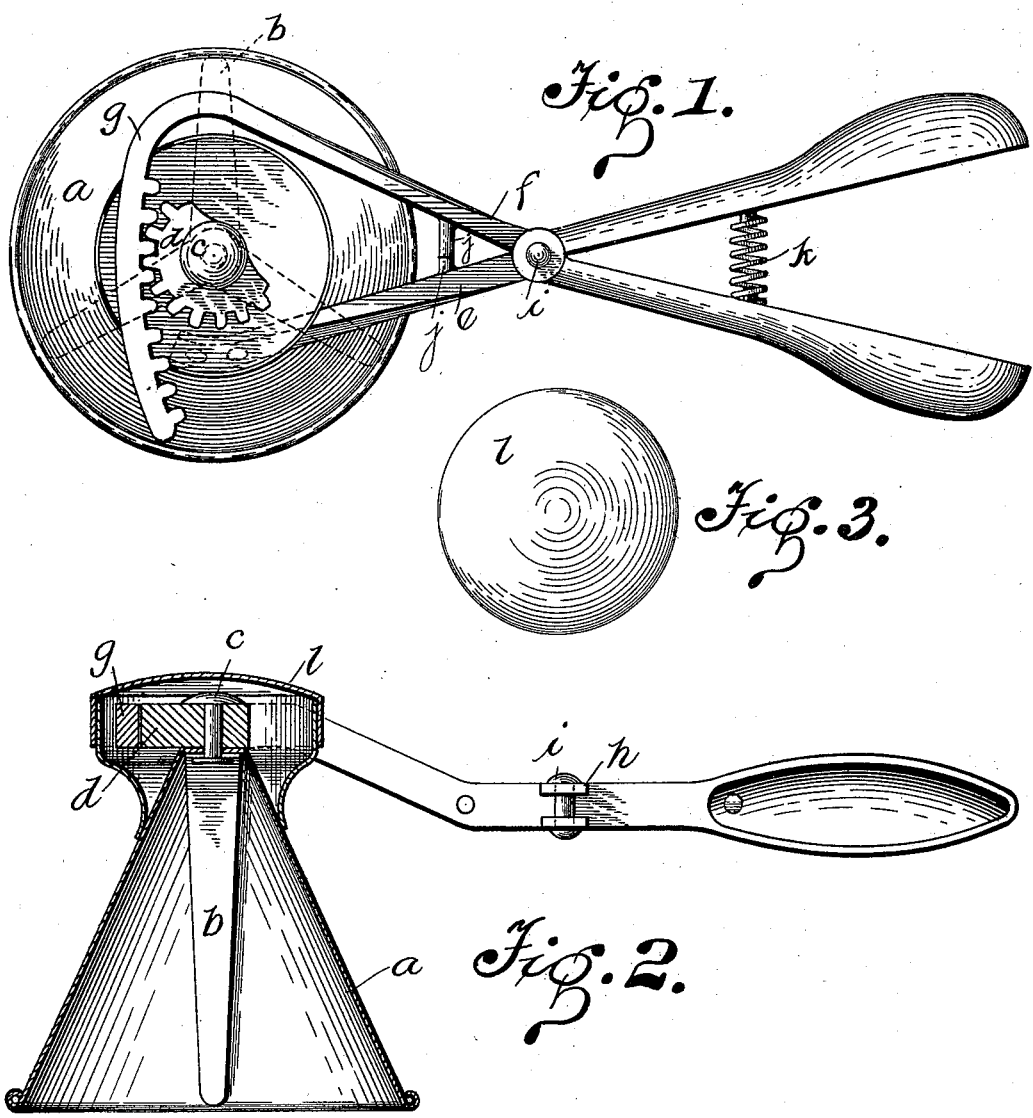
Witnesses:
A. R. Appleman
A. M. Wilson
Inventor.
Herman A. Weber.
By Henry C. Evert, Att'y.
THE NORRIS PETERS CO., PHOTO-LITHO., WASHINGTON, D. C.

United States Patent Office.

HERMAN AUGUST WEBER, OF PITTSBURG, PENNSYLVANIA.

ICE-CREAM MOLD AND DISHER.

SPECIFICATION forming part of Letters Patent No. 599,157, dated February 15, 1898.

Application filed May 4, 1896. Serial No. 590,129. (No model.)

*To all whom it may concern:*

Be it known that I, HERMAN AUGUST WEBER, a citizen of the United States of America, residing at Pittsburg, in the county of Allegheny and State of Pennsylvania, have invented certain new and useful Improvements in Ice-Cream Molds and Dishers, of which the following is a specification, reference being had therein to the accompanying drawings.

This invention relates to certain new and useful improvements in ice-cream molds and dishers, and has for its object to construct a mold and disher that can be operated with one hand instead of requiring both hands to operate, as in the ordinary construction.

A further object of the invention is to construct a mold and disher that will be extremely simple in its construction, strong, durable, effectual in its operation, and comparatively inexpensive to manufacture; furthermore, that will have no delicate parts of mechanism to get out of order or come in contact with the substance on which it is being employed.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a top plan view of my improved mold and disher with cap removed. Fig. 2 is a vertical sectional view of the same, showing one-half of handle. Fig. 3 is a top plan view of the cap.

In the drawings, $a$ represents the mold, which is preferably cone-shaped in form, the apex of the cone being flattened to allow of the free working of the cutters $b\,b$, which are secured to the base by a rivet $c$, which secures a segmental rack or half cog-wheel $d$ on the top of the mold. The handle is formed in two portions $e$ and $f$, respectively, the inner end of the handle $e$ being rigidly secured to the mold and the inner end of the handle $f$ formed with a hook portion $g$, provided with teeth to engage in the cogs of the wheel $d$. The two portions of the handle are pivotally secured together by means of jaws $h\,h$, formed on the portion $f$, adapted to receive a lug of the handle $e$, through which is inserted the rivet $i$. Stop-pins $j\,j$ are provided on the two portions of the handle to prevent the same from closing farther than to the desired point, and a spring $k$ is arranged between the two portions to force the same apart when the pressure is released and return the cutters to their normal position. A cap $l$ is adapted to fit over the apex of the cone-shaped mold and is fastened thereto and is slotted to allow of the operation of the hook portion of the handle $f$, and in the drawings shown herein I have shown the two portions of the handle hollow and bulb shape to fit the hand of the operator, and will also lighten the same.

The operation of my improved ice-cream mold and disher will be readily apparent from the views of the same that I have shown in the drawings. When the operator grasps the two portions of the handle at the outer ends and forces the same together, the inner ends will be forced apart, causing the teeth of the hook portion $g$ to engage with the teeth of the ratchet $d$ and revolve the same, which in turn communicates motion to the cutters $b\,b$ and causes the same to travel on the inner face of the mold and loosen the substance therefrom. When the pressure on the handle is released, the spring $k$ will force the outer portions of the handle apart again and reverse the motion of the cutters, returning same to their normal position.

It will be observed that various changes may be made in the details of construction without departing from the general spirit of my invention.

Having fully described my invention, what I claim as new, and desire to secure by Letters Patent, is—

1. In a disher and mold, a mold, a half cog-wheel on top of said mold, cutters secured to the base of the apex of said mold, a handle formed in two portions pivotally secured together, one of said portions secured to the mold and the other provided with a toothed rack engaging the half cog-wheel, substantially as shown and described.

2. A disher and mold consisting of a suitably-shaped mold, a half cog-wheel secured on top of said mold, cutters secured to the base of the apex of said mold, a handle formed in two portions pivotally secured together, one of said portions secured to the mold and the other having a toothed rack engaging the half cog-wheel, a spring arranged between the portions of the handle to retract the same, and a cap adapted to fit on top of the mold and cover the ratchet portion, substantially as shown and described.

In testimony whereof I affix my signature in presence of two witnesses.

HERMAN AUGUST WEBER.

Witnesses:
   H. E. SEIBERT,
   ALFRED M. WILSON.